United States Patent [19]

Rheindorf

[11] 4,308,569
[45] Dec. 29, 1981

[54] ELECTRIC CAPACITOR

[75] Inventor: Hans H. Rheindorf, Herbrechtingen, Fed. Rep. of Germany

[73] Assignee: Siemens Aktiengesellschaft, Berlin & Munich, Fed. Rep. of Germany

[21] Appl. No.: 68,449

[22] Filed: Aug. 21, 1979

[30] Foreign Application Priority Data

Sep. 6, 1978 [DE] Fed. Rep. of Germany ....... 2838831

[51] Int. Cl.³ .............................................. H01G 1/11
[52] U.S. Cl. ..................................... 361/275; 141/70;
141/95; 141/326; 361/279; 361/327
[58] Field of Search ....................... 361/327, 275, 279;
141/95, 326, 70

[56] References Cited

U.S. PATENT DOCUMENTS 2,204,166  6/1940  Usselman ............................. 361/279
2,333,898 11/1943  Stevenson .......................... 141/70 X
2,452,799 11/1948  Speaker ............................. 361/279 X
2,518,100  8/1950  Tomkins ............................. 141/70 X
3,335,343  8/1967  Moore et al. ...................... 361/327 X

FOREIGN PATENT DOCUMENTS 296880  5/1965  Netherlands ......................... 361/275

Primary Examiner—Elliot A. Goldberg
Attorney, Agent, or Firm—Hill, Van Santen, Steadman, Chiara & Simpson

[57] ABSTRACT

An electric capacitor containing a winding of paper and/or synthetic dielectric foils and metallic coatings and having at least one winding which is disposed in a sealed gas-tight housing containing an excessive pressure safety system and filled with an impregnation fluid, such as mineral oil, up to a predetermined buffer volume. In accordance with the invention, the impregnation fluid is saturated with an electro-negative gas and the buffer volume in the housing likewise is filled with such gas in an amount which assures a pressure higher than the normal pressure but, lower than the response pressure for the safety system.

3 Claims, 3 Drawing Figures

ELECTRIC CAPACITOR

BACKGROUND OF THE INVENTION

The invention relates to an electric capacitor which contains a winding of paper and/or synthetic dielectric foils and metallic coatings, and having at least one winding which is disposed in a metal cup-shaped housing sealed gas tight and containing electrical supply conductors. The housing also contains an excess pressure safety system and is filled with a dielectric, halogen-free, non-polar impregnation liquid, for example, mineral oil, up to a predetermined buffer volume.

In such capacitors, the metallic coatings comprise, for example, either regeneratable, thin metalizations which are applied to dielectric foils, or to separate carrier foils, or utilizes metal foils which are wound together with the dielectric foils. A break-away protective fuse, functioning as an excess pressure safety system, usually comprises a tensioned conductor wire with a rated break point, which wire simultaneously serves as the electric supply line to the capacitor winding, and is secured, for example, to the cover the capacitor housing. In the event of an undesirable increased pressure within the interior of the capacitor housing, such pressure is transformed into an expansion force applied to crimps or corrugations formed in the capacitor housing, whereby the distance between the bottom of the cup-shaped housing and the cover thereof is increased, thus resulting in rupture of the conductor wire.

In capacitors of this type, impregnated with oil, the winding must be completely impregnated in order to suppress partial discharges therein. In addition thereto, as much as possible of the dead space present in the housing, adjacent the winding, is filled with oil so that the winding remains covered irrespective of changes in orientation or position of the capacitor. However, because of the different coefficients of expansion of the impregnation oil and the other capacitor materials, a gaseous buffer volume is necessary in capacitors employing rigid housings, in order to accommodate the relatively greater change in volume of the impregnation oil. Generally, this buffer volume is filled with air.

In a closed structure, as the oil is usually previously completely dried and de-gassed, the difficulty can arise that this air mass is absorbed by the oil and a low pressure thereby arises in the capacitor housing. In accordance with Paschen's Law, which describes a reduced puncture strength as a result of reduced pressure, ionization processes and corona discharges can therefore occur, which can openly lead to a disruptive breakdown.

In order to avoid the low pressure occurring because of the absorption of the buffer gas, such capacitors are therefore left opened for a relatively long period of time, following the impregnation, or are repeatedly aired out. However, on the other hand, corona discharges in the winding are again promoted by the air absorption of the impregnation agent. For example, given a greater cooling, the shrinking impregnation agent cannot flow sufficiently rapidly from the exterior to the interior of the winding so that gaps crack open in the winding, into which the absorbed air prefers to diffuse. With an application of an alternating voltage, corona discharges arise in these gaps in a known manner, which discharges attack the dielectric and finally lead to disruptive breakdown, and thus to the destruction of the capacitor.

BRIEF SUMMARY OF THE INVENTION

The invention therefore has among its objects the production of a capacitor structure, of the type initially referred to, in which the difficulties discussed are eliminated.

This objective is achieved in accordance with the invention by saturating the impregnation liquid with an electronegative gas, and by similarly filling the buffer volume in the housing with such a gas in an amount which assures a pressure that is higher than the normal pressure, but lower than the response pressure for the safety system.

In accordance with a further development of the invention, the electro-negative gas employed is sulfurhexafluoride ($SF_6$). The invention has the advantage that, as a result of the presence of an electro-negative gas, corona discharges in the winding are subsequently avoided in the event of pressure or temperature changes in the capacitor structure.

In accordance with a further development of the invention, an upwardly extending tube is provided at the top of the capacitor housing for determining the oil level therein, through which tube the impregnation agent is forced out by the internal pressure of the electro-negative gas to a surface level predetermined by the lower end of the tube. The tube may then be closed by means of soldering, welding or the like. The advantage is thus achieved that the charging of the gas can be effected at an increased pressure, whereby the impregnation of the winding is accelerated.

In a further embodiment of the invention, a connection valve structure is provided for effecting the charging of the housing with gas, which valve structure acts as a check valve to prevent gas, even under pressure in the capacitor housing, from being expelled therefrom. Such valve structure is subsequently sealed by means of soldering, welding or the like, following the completion of the impregnation and charging of the capacitor with the electro-negative gas.

The manufacture of the capacitors can be further accelerated by means of this embodiment since the capacitor, following the charging of the buffer volume with the necessary amount of gas, or the charging to a predetermined pressure, can be closed immediately thereafter and further fabricating operations performed while the impregnation and absorption process continues within the interior of the housing.

BRIEF DESCRIPTION OF THE DRAWINGS

In the drawing wherein like reference characters indicate like or corresponding parts.

DETAILED DESCRIPTION OF THE INVENTION

Figure 1:
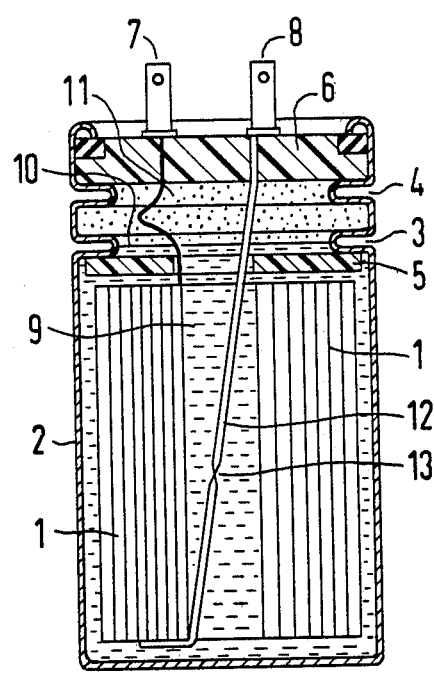
FIG. 1 is a vertical sectional view of a capacitor disposed in a housing provided with expansion crimps or corrugations.

Referring to FIG. 1 of the drawing, the reference numeral 1 indicates a capacitor winding disposed within a cupshaped housing 2, which is sealed gas tight. The winding 1 is retained in the housing 2 by means of a retaining disk 5 and the relatively closed crimp 3. The cover 6 is engaged with a further relatively closed crimp 4, and is provided with two external terminals 7 and 8 for the electrical connections to the winding 1. The housing 2 is filled with an impregnation liquid 9, whereby a buffer volume, which is filled with an electro-negative gas 11, extends between the surface 10 of the liquid 9 and the lower side of the cover 6. One electrical feed conductor 12 forming the electrical connection from the terminal 8 to the capacitor winding 1 is designed as a breakaway fuse structure having a rated break point 13. Upon the existence of an unacceptable increase in pressure in the interior of the capacitor housing 2, the crimps 3 and 4 are deformed thereby to a relatively open condition, resulting in the breaking of the feed conductor 12 at the rated break point 13, whereby the capacitor is operatively disconnected, thereby eliminating a further expansion and possible bursting of the capacitor housing.

Figure 2:
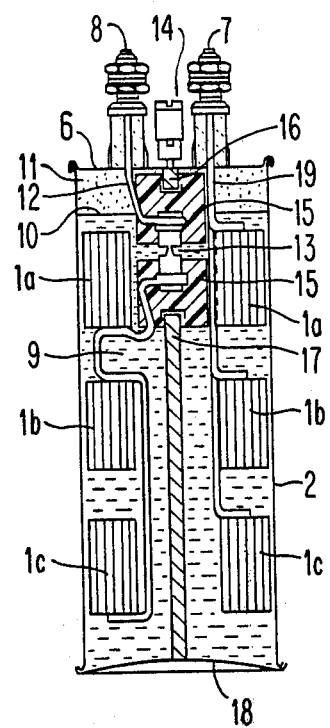
FIG. 2 is a similar view of a capacitor disposed in a housing provided with a movable bottom wall.

FIG. 2 illustrates a capacitor provided with three windings 1a, 1b, and 1c which are disposed in the housing 2 and the latter sealed gas tight. The external electrical terminals 7 and 8 for the windings 1a through 1c, as well as the housing terminal 14, are arranged on the cover 6. The supply conductor 12, from the terminal 8 to the windings 1a through 1c, likewise is provided with a break-away fuse structure having a rated break point 13. In this embodiment, the excess pressure safety structure comprises an insulating gripping device 15 which is clamped between an upper retention strip or member 16 and a lower retention strip or member 17. The adjacent portions of the rated break point 13 of the conductor 12 is disposed in the gripping device 15 with the lower retention strip 17 being secured to the housing bottom 18. The latter functions as a working membrane which, in the presence of excessive pressure within the housing 2, exerts a tension force on the gripping device 15 over the strips 16 and/or 17, whereby the supply conductor 12 is broken at the rated break point 13. A positive disconnection is thus assured to prevent a possible bursting of the housing 2. The opposite sides of the windings 1a through 1c are connected with the external terminal 7 by means of an unprotected conductor 19. The housing 2 is filled with the impregnation liquid 9 whereby a buffer volume, which is filled with the electro-negative gas 11, is disposed above the liquid level 10.

Figure 3:
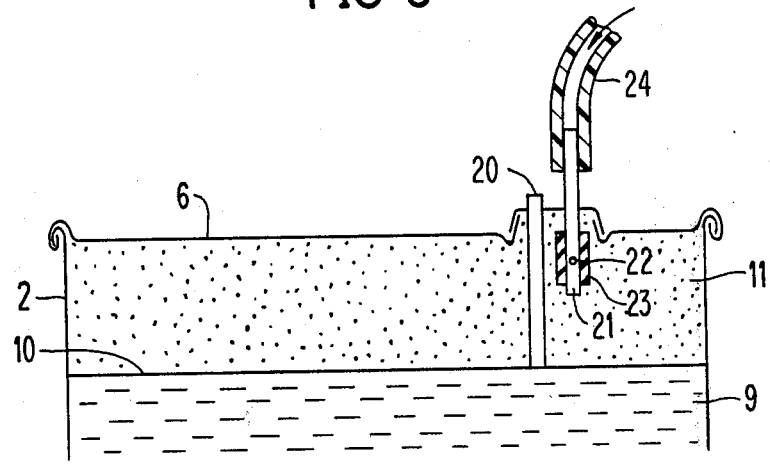
FIG. 3 is a similar view of the upper portion of a capacitor housing illustrating a connection valve structure arranged in the end wall, i.e. top or bottom wall of the capacitor housing.

FIG. 3 illustrates a connection-valve structure, which, for example, is employed for the charging of the structure with gas and for setting a specific liquid level within the capacitor housing. A tube 20 whose inner end determines the level 10 of the impregnation liquid 9 is supported by the cover 6, or the corresponding opposite bottom wall of the capacitor housing 2. A second tube 21, closed at its bottom end, forms a valve structure having a valve opening 22 which is adapted to be closed by a short section of resilient hose 23. A suitable hose 24 serves as a supply line for the electro-negative gas 11 and is attached to the external free end of the tube 21. The cup-shaped housing 2 is initially filled completely with the impregnation liquid 9, following which the electro-negative gas 11, under pressure, is admitted into the housing 2 through the hose 24, initially forcing out excess impregnation liquid 9 until the level 10 as predetermined by the tube 20 is reached. At this point, the tube 20 is sealed, for example by means of soldering, welding or the like of the external end thereof. Thereafter, an excess pressure is built up in the interior of the capacitor housing 2 by the further supply of electro-negative gas 11, until the desired pressure or amount of gas has been supplied.

Retention of the desired excess gas pressure is assured by the fact that a return flow of the gas 11 introduced, under pressure, into the interior of the capacitor housing through the valve opening 22 is prevented by the resilient hose section 23. The excess pressure in the interior of the housing 2 results in absorption of electro-negative gas by the impregnation liquid 9. An acceleration of the manufacturing operations is thus achieved by use of the connection-valve structure illustrated, as the absorption process of the gas 11 into the liquid 9 automatically continues if the housing 2 has been filled with gas 11 to an appropriate excess pressure. It will be appreciated that the check valve structure can also be of any other suitable form which permits the suitable control of the charging gas. Likewise, the determination of the filling level of the impregnating liquid can be achieved by means other than that illustrated.

In a preferred embodiment, the capacitor winding is constructed of dielectric foils of polypropylene. As coatings, paper bands provided on both sides with regeneratable thin metalizations are also wound whereby the metalizations on the paper bands are conductively connected with one another, so that the paper bands are disposed in the field-free space. The impregnation liquid in such case comprises an insulating oil which contains aromatic parts which, in particular, can bind hydrogen, naphthenic parts and paraffinic parts. The dielectric foils disposed therein thereby are so swelled by the impregnation fluid that a homogeneous dielectric is present between the coatings.

In another embodiment, the dielectric foils comprise paper on which the coatings are vapor-deposited as regeneratable thin metalizations.

Although I have described my invention by reference to particular illustrative embodiments, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim as my invention:

1. An electric capacitor comprising in combination:
    at least one winding of dielectric foils of paper and/or synthetic and metallic coatings;
    power supply conductors provided for each winding;
    a metal housing containing said winding or windings, sealed gas tight, and provided with an excess pressure safety system;
    a dielectric, halogen-free, non-polar impregnation liquid filling said housing up to a buffer volume;
    an electro-negative gas saturating the impregnation liquid and filling the buffer volume in said housing, said electro-negative gas provided in an amount which assures a pressure therein that is higher than the otherwise normal pressure but is lower than the response pressure of the pressure safety system; and
    an upright vent tube attached to an upper side of the capacitor housing, and communicating with the housing interior for the discharge of the impregnation liquid by the electro-negative gas pressure during liquid filling of the capacitor, the bottom end of said vent tube being disposed at the desired ultimate surface level of said impregnation liquid, and which tube, is sealed gas tight.

2. An electric capacitor according to claim 1, comprising in further combination, a connection-valve structure carried by said housing, by means of which electro-negative gas can be introduced into the housing during manufacture, said connection-valve structure including means forming a check valve, permitting the flow of gas therethrough into the housing but preventing the flow of gas therethrough out of the housing.

3. An electric capacitor according to claim 2, wherein said electro-negative gas is sulfurhexafluoride ($SF_6$).

* * * * *